April 23, 1968   H. H. ANDERSON   3,379,332
CLOSURE DEVICES

Filed May 4, 1965

Inventor

HAROLD HENRY ANDERSON

By Mason, Fenwick & Lawrence

Attorneys

# United States Patent Office 3,379,332
Patented Apr. 23, 1968

3,379,332
CLOSURE DEVICES
Harold Henry Anderson, Cathcart, Glasgow, Scotland, assignor to G. & J. Weir Limited
Filed May 4, 1965, Ser. No. 453,150
Claims priority, application Great Britain, May 5, 1964, 18,589/64
6 Claims. (Cl. 220—46)

ABSTRACT OF THE DISCLOSURE

A closure device for a chamber, comprising a closure plate and a ring recessed into a wall of the chamber, the plate being arranged to engage with the ring to close the chamber so that any force within the chamber forces the plate into closer engagement with the ring, and the ring being an endless metal ring of substantially rectangular cross-section which is deformed to a substantially oval shape for fitment into, or removal from, the chamber.

This invention relates to improvements in chamber closure devices particularly but not exclusively for a pressure chamber.

In the case of some present pressure chambers, for example in pumps and turbines, the open end of the pressure chamber is formed with a flange and is closed by a plate, with a sealing gasket between the flange and plate, the plate being clamped in position by a ring of bolts or studs. This arrangement has the disadvantage that the bolts or studs can become extended by pressure increases within the chamber or by thermal differential expansion and thus leakage can occur. Similar disadvantages could arise in the case of mechanically induced pressure increases.

It is an object of the present invention to obviate or mitigate the above disadvantage.

According to the present invention there is provided a closure device for a chamber particularly but not exclusively a pressure chamber, the device comprising a closure plate and a ring intended to be partially recessed into a wall of the chamber, the closure plate being arranged to engage with the ring to close the chamber so that any force exerted within the chamber trying to open the chamber forces the plate into closer engagement with the ring.

The present invention is also a chamber having an opening, a closure plate for closing the opening, a ring recessed into a wall of the chamber around the opening, the closure plate being arranged to engage with the ring to close the chamber so that any force exerted within the chamber trying to open the chamber forces the plate into closer engagement with the ring.

Preferably the ring is a circular resilient deformable metal ring which is temporarily deformed to oval shape for insertion into and removal from the recessed wall.

Preferably the ring is partially recessed into the inside wall of the chamber.

The ring may, however be formed from a number of segments, and clamping means may be provided to clamp together the ring and the plate.

The clamping means may comprise inner and outer clamping members arranged to sandwich therebetween the ring and plate, a plurality of bolts being provided for bolting these members together, the bolts passing through aligned holes provided in the ring and plate.

Figure 1:
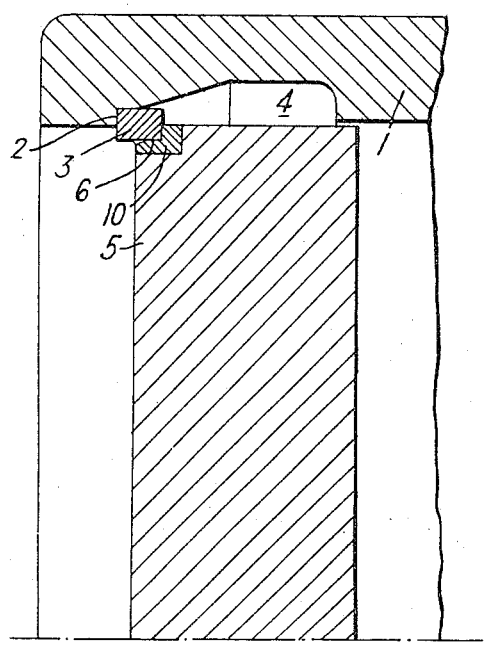
Figure 2:
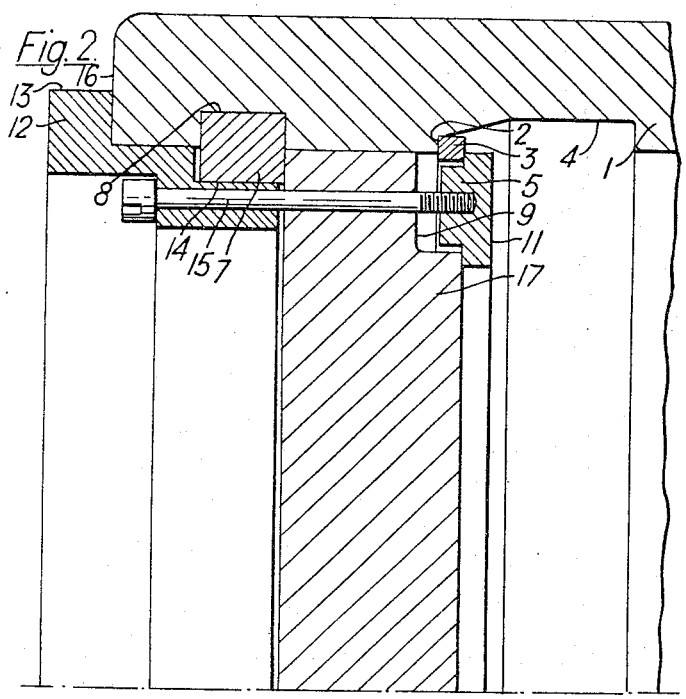

Embodiments of the present invention will now be described by way of example with reference to the accompanying drawings in which:

FIGS. 1 and 2 are sectional elevations of two different embodiments of part of a pressure chamber having closure devices according to the present invention.

Similar parts in the two embodiments have been given the same reference numbers for clarity.

In the embodiment illustrated in FIG. 1 the inside wall 1 of a pressure chamber, adjacent its open end, the other end being closed is grooved at 2 to accommodate a circular or slightly oval ring 3 which is shown as being of rectangular cross-section but which may be of any other suitable cross section when the ring 3 is positioned in the groove 2, it protrudes for a short distance into the bore of the pressure chamber. Preferably the ring is endless, thus to fit it into the groove 2 it is necessary to distort it into an oval shape and position it in the bore in a plane which is not normal to the axis of the pressure chamber. Since the bore of the pressure chamber is of smaller diameter than the outside diameter of the ring 3, in order that the ring, in its oval shape, can be positioned in the groove 2, a further cavity 4 is necessary in the inside wall of the pressure chamber. This cavity which opens into the groove, is positioned to the side of the groove remote from the open end of the pressure chamber and is shaped to allow the ring, in its oval shape, to be manipulated into the groove. The ring can then assume its normal circular or slightly oval shape with its outer face abutting the outer face of the groove 2 in the pressure chamber.

The endless ring 3 in its free unstressed shape may be of circular or oval shape. During insertion into the chamber bore or during service operation the endless ring may be subject to bending stresses tending to alter the measure of its ovality or may be deflected beyond its elastic limit.

The closure plate 5 of the pressure chamber is of outside diameter almost equal to the bore of said chamber and has a rebate 6 on its outer face at its periphery to accommodate the part of the endless ring 3 protruding into the bore of the pressure chamber. Thus when there is any hydrostatic pressure in the pressure chamber trying to open the chamber the closure plate is forced against the endless ring effectively sealing the chamber.

The embodiment described above is for use in pressure chambers where relatively low pressure differences exist across the end plate. Where higher pressures exist pressure chambers incorporating a strengthening modification of the above embodiment are used.

In this embodiment, illustrated in FIG. 2, the endless ring 3 is used as a seal. The hydrostatic thrust is opposed by a segmented ring 7 accommodated in a second groove 8 in the inside wall 1 of the pressure chamber.

This second groove 8 is positioned between the open end of the pressure chamber and the groove 2 for the endless ring 3 so that the distance between the inner faces of the two rings positioned in the grooves is approximately equal to the thickness of a cylindrical member or end plate 17.

The end plate 17 abuts the inner face of this segmented ring 7 and has a rebate 9 on its inner face at its periphery to accommodate an inner clamping member in the form of an annular closure ring 5 and the part of the endless ring 3 protruding into the bore of the pressure chamber.

The annular ring 5 has an outside diameter slightly smaller than the inside diameter of the endless ring 3 and has a rim 11 raised from both its outside and inside peripheries, the outer faces of said rims abutting the inner faces of the endless ring 3 and the end plate 17 respectively.

An outer clamping member in the form of a keeper ring 12 of outside diameter approximately equal to the bore of the pressure chamber has a raised rim 13 at its outer end, the inner face of this rim abutting the end face 16 of the pressure chamber. The keeper ring 12 extends axially into the pressure chamber an amount such that its inner face almost reaches the outer face of the end plate 17. The inner face of the keeper ring has a rebate 14 at its outer periphery to accommodate the segmented ring 7.

The keeper ring 12, segmented ring 7 and end plate 17 are drilled at suitable intervals on the same diameter so that bolts 15, or other suitable means can be passed through the drilled holes and attached to the closure plate 5 thus clamping the segmented ring 7 and closure plate in position.

An L-shaped ring 10 of a high tensile material is fitted in a recess cut in the outer periphery of the closure plate 5. The sealing ring 3 is also of high tensile material and thus crush stress of the normal material of the pressure vessel 1 and the closure plate 5 is minimised.

Thus all joints at the end of the pressure chamber are self sealing as pressure within the vessel is increased.

As the closure plate 5 (FIG. 1) and ring 5 (FIG. 2) is manufactured from some resilient material tightening the bolts 15 will cause the plate to be slightly coned.

In operation pressure within the chamber forces the closure plate 5 (FIG. 1) and ring 5 (FIG. 2) into closer engagement with the seal ring 3 thus improving the seal.

I claim:

1. A chamber having an opening, a closure plate for closing the opening, the segmental ring recessed into a wall of the chamber around the opening, the closure plate arranged to engage with the ring to close the chamber so that any force exerted within the chamber trying to open the chamber forces the plate into closer engagement with the ring and clamping means being provided to clamp together the ring and the plate said clamping means comprising inner and outer clamping members arranged to sandwich therebetween the ring and plate, a plurality of bolts being provided for bolting these members together, the bolts passing through aligned holes provided in the ring and plate and a further ring recessed into the wall of the chamber abutting said inner clamping member to seal the inner clamping member with respect to the wall of the chamber.

2. A chamber as claimed in claim 1, in which the further ring is a circular resilient deformable metal ring which is temporarily deformed to oval shape for fitment into and removal from the chamber.

3. A chamber as claimed in claim 1 in which the further ring is a oval resilient deformable metal ring which is temporarily deformed to increase its original ovality for fitment into and removal from the chamber, the originally oval ring being deformed to a substantially circular shape after fitment into the chamber to seat in the wall recess.

4. A chamber as claimed in claim 2 in which any or all of the deformations of the further ring may involve deformation beyond the elastic limit of the material of the ring.

5. In a chamber having an opening, a closure plate for the opening, an endless metal ring partially recessed into a groove in the inner wall of the chamber adjacent the opening, the closure plate being arranged to engage with the ring to seal the chamber, the improvement comprising the ring having parallel bearing faces, said faces being perpendicular to the direction of the force acting on the plate tending to open the chamber to ensure that any force within the chamber trying to open the chamber forces the plate into closer engagement with the ring and the inner wall of the chamber having a cavity opening into the groove, positioned to the side of the groove remote from the open end of the chamber and having a shape to allow the ring when distorted to be at least partially received therein and manipulated into the groove.

6. A chamber as claimed in claim 5, in which the closure plate is an annular plate intended to close an annular clearance between the chamber and an end plate held against movement out of the chamber by a segmental ring recessed into the wall of the chamber, inner and outer clamping means being provided to hold said annular plate against the endless metal ring and the end plate.

References Cited

UNITED STATES PATENTS

| 724,939 | 4/1903 | Reis | 220—46 |
| 2,219,659 | 10/1940 | Price | 220—46 |
| 2,342,186 | 2/1944 | Fisher | 220—46 |
| 2,385,751 | 9/1945 | Baker | 220—46 |
| 2,582,995 | 1/1952 | Laurent | 220—25 |
| 2,584,100 | 1/1952 | Uecker | 220—46 |
| 2,959,322 | 11/1960 | West | 220—46 |
| 3,054,173 | 9/1962 | Laurent | 220—55 X |

THERON E. CONDON, *Primary Examiner.*

GEORGE E. LOWRANCE, *Examiner.*